April 1, 1969 W. J. SCHEUERER 3,435,930
TAPERED ROLLER BEARING ASSEMBLIES FOR ELECTRIC MOTORS
Filed May 25, 1967 Sheet 2 of 2
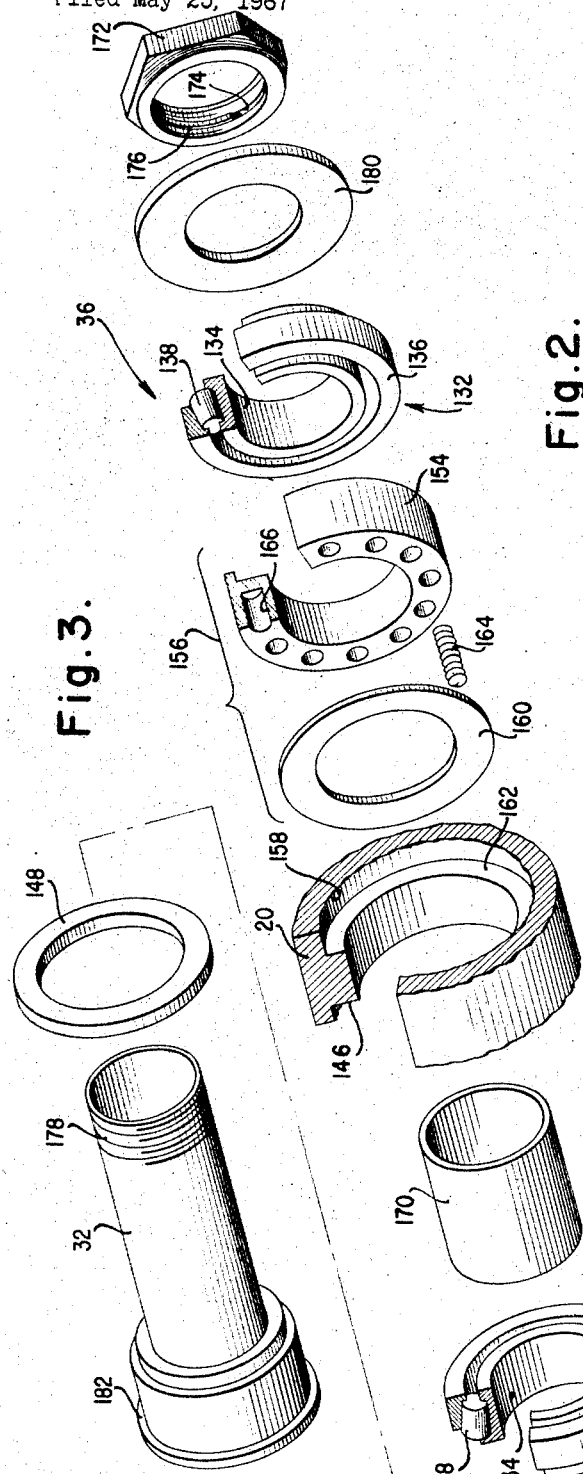
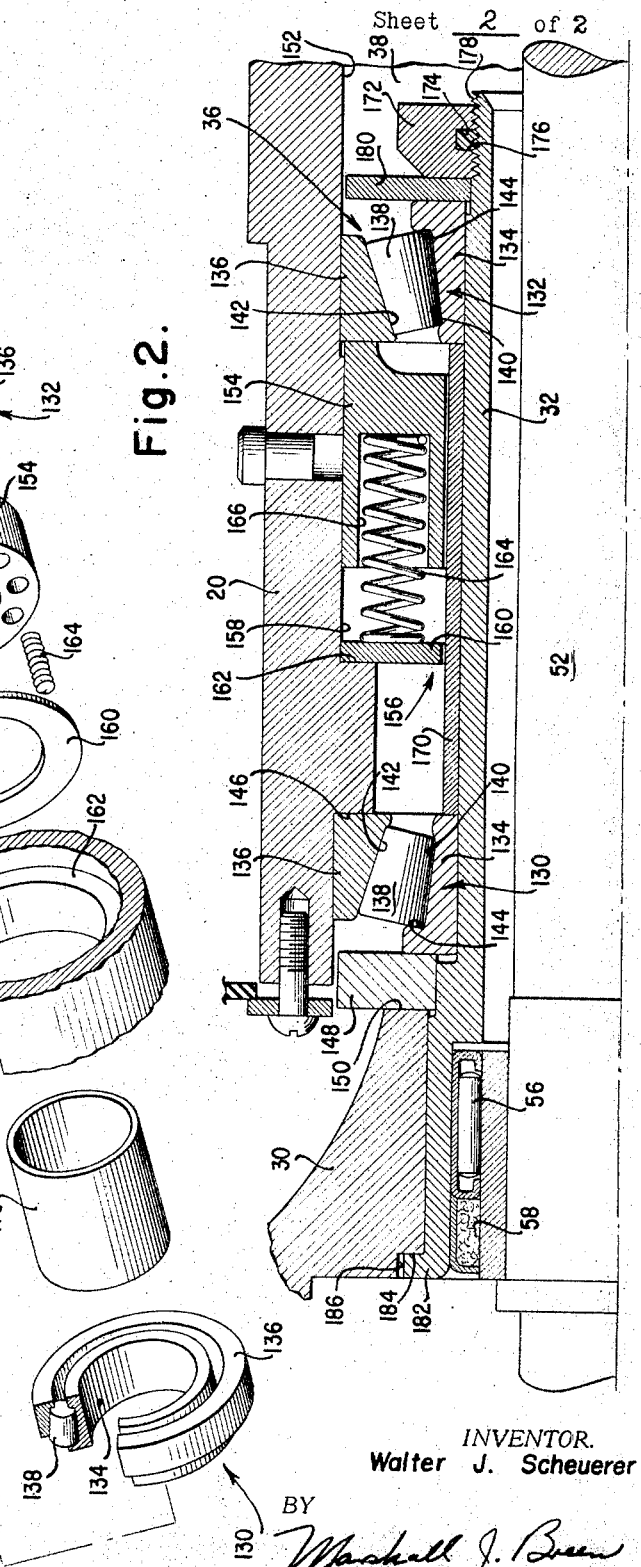
INVENTOR.
Walter J. Scheuerer

# United States Patent Office 3,435,930
Patented Apr. 1, 1969

3,435,930
TAPERED ROLLER BEARING ASSEMBLIES FOR ELECTRIC MOTORS
Walter J. Scheuerer, Califon, N.J., assignor to The Singer Company, New York, N.Y., a corporation of New Jersey
Filed May 25, 1967, Ser. No. 641,187
Int. Cl. F16d *11/06, 13/22, 67/02*
U.S. Cl. 192—18
4 Claims

ABSTRACT OF THE DISCLOSURE

This disclosure relates to a tapered roller bearing assembly for an electric motor. More particularly, the disclosure relates to a tapered roller bearing assembly including a pair of bearings cooperatively mounted between the shaft and the housing having one of the bearings axially fixed and the other resiliently positioned so that a predetermined running clearance may be maintained during operation of the motor, which clearance may be in the range of .001 to .003 inch.

Background of the invention

Heretofore in the prior art if the bearing assemblies require predetermined running clearance in the order of .001 to .003 inch either all mounting surfaces would have to be precision machined or laminated shims would have to be inserted between the outer races of the tapered roller bearings. Thus, not only was the procedure expensive and time consuming, but it was also subject to costly errors in assembly that if not detected would lead to breakdowns or excessive wear of the motor.

Summary of the invention

In accordance with the present invention the novel tapered roller bearing assembly is provided for a rotary machine and includes a pair of spaced tapered roller bearings rotatably connecting a shaft to the machine housing. Each of the bearings includes an inner race disposed on the shaft, an outer race and plurality of tapered rollers therebetween. One of the outer races is fixed axially to the housing, while the other outer race is disposed in axially slideable engagement thereto. Means axially fixing the inner races in spaced relationship to each other so that the one of the inner races is urged in the direction of the fixed outer race to operatively position the tapered rollers therebetween. A resilient means connected between the housing and the slideable outer race that will urge the slideable outer race in the direction of the other inner race to operatively position the tapered rollers therebetween, whereby on operation of said machine the bearing assembly will maintain a predetermined running clearance.

It is therefore an object of the present invention to provide an improved tapered roller bearing assembly which overcomes the prior art deficiencies; which is simple, economical, and reliable; which permits the maintainance of a running clearance of .001 to .003 inch for said bearing assembly; which has both axially fixed and axially slideable components; which is capable of operating under high lateral forces; which is capable of operating under high clutch forces; and which is easy to assemble.

Other objects and advantages will be apparent from the following description of one embodiment of the invention and the novel features will be particularly pointed out hereinafter in the claims.

Brief description of the drawings

This invention is illustrated in the accompanying drawings in which:

FIGURE 2 is a greatly enlarged quarterly view partly in section, of the novel tapered roller bearing assembly shown in FIGURE 1.

FIGURE 3 is an enlarged exploded view, turned at the housing for better visibility, of the present invention and including the shaft and the housing between which said bearings are assembled.

Description of the invention

Figure 1:
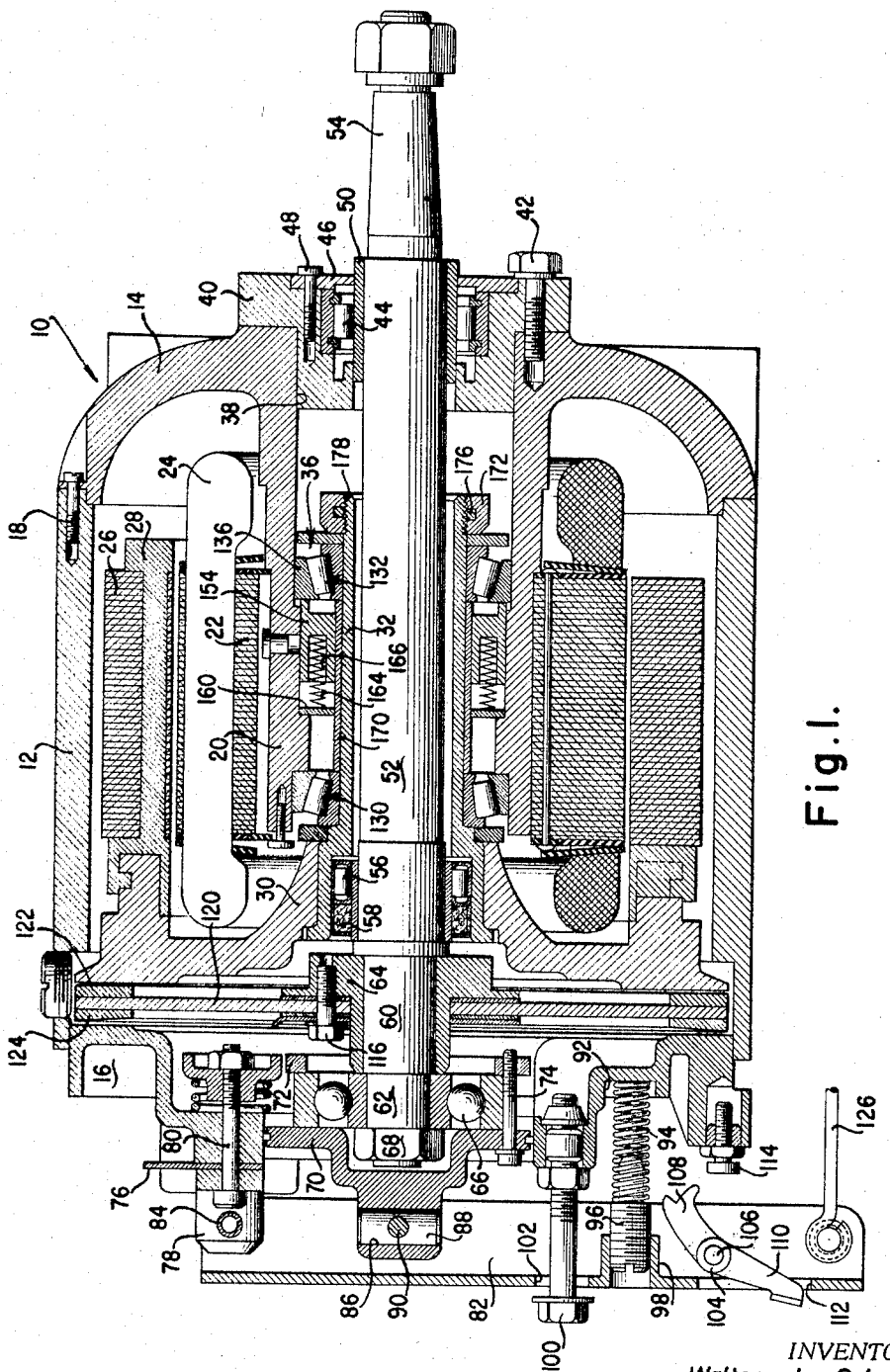
FIGURE 1 is a longitudinal sectional view of an electric motor in which the present invention is embodied.

The present invention is contemplated for use in any type of rotary machine. However, for illustrated purposes a conventional electric clutch-brake motor of the inverted type is shown in the drawings embodying the present invention. The electric clutch-brake motor will be herein illustrated and described only insofar as it is necessary for an understanding of the present invention. For a more detailed explanation of the motor reference may be had to W. J. Scheuerer's U.S. Patent No. 3,253,686, granted May 31, 1966 for "Electric Clutch-Brake Motors."

The motor, designated generally as 10, is illustrated in FIGURE 1 and has a motor frame or casing which includes a cylindrical housing 12 and enclosures 14 and 16 which are secured to housing 12 by circumferentially spaced bolts 18 that are taped into the ends of housing 12, only one of which is shown in the upper right hand corner. A re-entrant tubular stator support or hub 20 is formed integrally with the enclosure 14 and extends into the housing 12 substantially concentrically with its cylindrical wall. The stator support 20 carries a laminated stator core 22 which is securely held in place on the support 20. A stator winding 24 is carried by the core 22 and is connected to a suitable source of electric power (not shown).

An inverted rotor core 26 surrounds the stator 22 and contains rotor conducting bars 28 cast integrally with a spider 30 secured for rotation with a tubular rotor shaft 32 which is journaled by the novel tapered roller bearing assembly, designated generally as 36, to the stator support 20. The improved bearing assembly 36 will be more fully described hereinafter.

Enclosure 14 has a central opening or bore 38 into which is disposed a counter-bored bearing cup 40 that is threadedly connected to end closure 14, as by screws 42. Bearing cup 40 receives the outer race of a roller bearing 44 secured by a cap 46 which is held in place by screws 48. An elongated inner race 50 for the bearing 44 is fitted tightly on a driven shaft 52 which is provided with a tapered portion 54 adapted to receive a gear or pulley (not shown) for driving a machine (not shown) such as a loom.

Adjacent its other end driven shaft 52 is journaled in a roller bearing 56 supported within the rotor shaft 32 at a location inwardly of the tapered roller assembly 36. The inner race 58 for bearing 56 is elongated and fitted to the shaft 52 to provide a bearing surface similar to that of inner race 50 so that the shaft is journaled for rotation and supported for limited endwise sliding movement relative the stationary housing 12.

The driven shaft 52 is formed with a step portion 60 and a pilot portion 62 of reduced diameter. A hub 64 is mounted on portion 60. The inner race of a control bearing 66 is disposed on portion 62 with its outer end in abutment with hub 64 and its inner end held in mounted position by a nut 68 threaded to the end of shaft 52. The outer race of control bearing 66 is positioned by a control plate 70, and a retainer ring 72 connected thereto by screws 74.

A feeler plate 76 is inserted between yoke 78 and end closure 16, and normally held firmly in position by spaced spring loaded studs 80. An actuating lever 82 is fulcrumed to yoke 78 by a fulcrum pin 84. A slideway 86 is provided in control plate 70 in which is positioned a trunnion block 88 pivotally fastened to the lever 82 by a pin 90. The lower portion of end closure 16 is formed with a socket 92 which seats one end of a brake spring 94. The other end of brake spring 94 embraces a reduced end of a brake adjusting screw 96 threaded into a boss portion 98 to lever 82. The shank of a large headed screw 100 passes through an aperture 102 in lever 82 and is adjustably connected to end closure 16 so as to establish a safe brake limiting position for the lever 82.

An inertial latch or snubber 104 is pivotally fastened to the lower end of the lever 82 by a pivot pin 106. The latch 103 comprises a latch finger 108 and a weighted tail portion 110 which swings freely through a slot 112 in the lever 82. An adjustable latch stop screw 114 is connected into the end closure 16 where it can be engaged by the latch finger 108. Secured to the hub 64 by means of circumferentially spaced screws 116 is a clutch disc 120 which carries a friction clutch facing 122 and a friction brake facing 124 on opposite sides thereof. The clutch facing 122 is adapted to engage a smooth clutch surface on spider 30, and the brake facing 124 is adapted to engage a brake surface formed on end closure 116.

When the lever 82 is actuated, as by endwise motion of a connecting rod 126, a thrust is transmitted through the control bearing 66 to the driven shaft 52 to move it endwise, thus carrying the driven clutch disc 120 into either clutch or brake engagement.

The novel tapered roller bearing assembly 36 includes a pair of bearings, carried by hub 20 in which the shaft 32 is journaled. The pair includes an inner bearing 130 and a tail stock bearing 132. The bearings, best shown in FIGURE 2, are disposed in mirror image to each other and includes inner races 134, outer races 136 and a plurality of tapered rollers 138 disposed therebetween. The taper of rollers 138 increases in the direction away from the other bearing. The inner race 134 and the outer race 136 have inclined walls 140 and 142 which correspond to the taper of the rollers and are adapted to be engaged thereby. Furthermore the inner race 134 has its inclined surface 140 defining a recess along the axial length of which rollers abutment means are formed at either end of the rollers 138, as for example at shoulder 144 which abuts the larger diameter end of roller 138.

The inner races 134 of bearing 130 and 132 respectively are spaced from each other and disposed about shaft 32. The outer race 136 of the inner bearing 130 is press-fitted to the hub 20 and abuts shoulder 146 that extends radially inwardly therefrom. The inner race 134 of the inner bearing 130 seats against a combined thrust member and lubrication seal 148 which in turn is seated against a thrust surface 150 formed on the spider 30. The outer race 136 of the tail stock bearing 132 is slideable in a counterbore 152 of the opening 38 in the end closure 14, and abuts against the annular projection of spring carrier 154 of the resilient means 156 which is slideable in counterbore 158. Resilient means 156 also includes a spring plate 160 that abuts a shoulder 162 formed in the hub 20 opposite shoulder 146, and a plurality of springs 164 that extend from abutment with spring plate 160 to be disposed into axial holes 166 formed in spring carrier 154. In assembled position spring 164 will always be in compression so as to preload spring carrier 154 and outer race 136 of tail stock bearing 132.

A spacer bushing or sleeve 170 is disposed about shaft 32 and extends to axially separate the inner races 134 of bearings 130 and 132, respectively. A self-locking nut 172 has a recess 174 formed intermediate its threaded inner section into which an O-ring 176 is disposed to seal its connection to threaded section 178 of shaft 32. A combined thrust member and lubrication seal 180 is disposed between inner race 134 of tail stock bearing 132 and nut 172. The drawing up of nut 172 acts to clamp shaft 32 and spider 30 by forcing the abutment of an upwardly extending annular flange 182 with a shoulder 184 formed by counterbore 186 of spider 30. The drawing up of nut 172 also causes the inner races 134 of bearings 130 and 132 to be clamped in axially fixed positions at either end of spacer bushing 170 and to cause these components and the interdisposed thrust members 148 and 180 to successively abut each other and the thrust shoulder 150 of spider 130.

The drawing up of nut 172 will cause the tapered rollers of the inner bearing to be seated against the inclined surfaces 140 and 142 respectively of the inner race 134 and the outer race 136 of the inner bearing 130 with a predetermined running clearance therebetween. Also the axial position of inner race 134 of tail stock bearing 132 has also been fixed. The axially exerted force of springs 164 of resilient means 156 will urge the outer race 136 of tail stock bearing 132 against tapered rollers 138 to cause their coming into engagement between the inner race 134 and the outer race 136 at a predetermined running clearance for bearing 132.

For the type inverted electric motor or clutch-brake motor 10 illustrated in the drawings it would be possible to obtain and maintain a running clearance in the order of .001 to .003 inch between the rotating components of the tapered roller bearing assembly 136.

It will be understood that various changes in the details, materials, arrangement of parts and operating conditions which have been herein described and illustrated in order to explain the nature of the invention may be made by those skilled in the art within the principles and scope of the invention as expressed in the claims.

Having thus set forth the nature of the invention, what I claim herein is:

1. A bearing assembly for a rotary machine comprising:
    (a) a housing,
    (b) a hollow shaft disposed in the housing,
    (c) a second shaft extending through the hollow shaft,
    (d) a first bearing means rotatably journaling the second shaft within the hollow shaft and having one end of the hollow shaft cantilevered therefrom,
    (e) a second bearing means including a pair of tapered roller bearings rotatably journaling the hollow shaft in said housing,
    (f) each of said bearings of the second bearing means includes an inner race disposed on the hollow shaft, an outer race and a plurality of tapered rollers therebetween,
    (g) the outer race remote from the cantilevered end of the hollow shaft has a fixed axial connection to the housing,
    (h) the outer race adjacent the cantilevered end of the hollow shaft disposed in axially slideable engagement with the housing,
    (i) means axially fixing the inner races in spaced relationship to each other and urging the one of the inner races in the direction of the fixed outer races to operatively position the tapered rollers therebetween, and
    (j) a resilient means connected between the housing and the slideable outer race yieldably to urge the slideable outer race in a direction of the other inner race to operatively position the tapered rollers therebetween whereby on operation of the second shaft by said machine the slideable outer race will permit the bearing assembly to maintain a predetermined running clearance.

2. The combination claimed in claim 1 wherein:
    (a) a third bearing means rotatably journaling the second shaft in the housing.

3. The combination claimed in claim 2 wherein:
    (a) a hub formed in the housing outwardly of the hollow shaft and the second shaft, (b) the outer races of the second bearing means operatively engaging the hub in fixed and slideable, respectively, axial positions, and (c) the third bearing means rotatably journaling the second shaft to the hub to place the second bearing means intermediate the first and the third bearing means.

4. A clutch-brake motor comprising:

(a) a housing having a hub extending inwardly from one end, (b) a stator mounted above the hub, (c) an armature disposed above the stator, (d) a pair of spaced tapered roller bearings, one axially fixed and one axially slideable in the hub, (e) a hollow shaft rotatably journaled to the hub by said bearings, (f) means connecting one end of the hollow shaft to the armature whereby said shaft will rotate with said armature, (g) a second shaft extending through the hollow shaft, (h) a second pair of bearing means mounted upon the second shaft on either side of the pair of tapered roller bearings; one rotatably journaling the second shaft to the end of the hollow shaft adjacent the armature connection thereof, and one rotatably journaling the second shaft in the hub, (i) a first means connected to the second shaft selectively to engage the armature connection means to cause said second shaft to be rotated thereby, or engage the housing to stop the rotation of said second shaft, (j) a second means connected to the second shaft to axially position said second shaft in operative position, (k) the hollow shaft having the end remote from the armature connection means cantilevering over the second shaft from the bearing connection thereto, and (l) resilient spring means yieldably engaging the axially slideable tapered roller bearing in operative position to provide for controlled movement thereof responsive the brake and clutch operation of the second shaft and to maintain a running clearance of between 0.001 inch to 0.003 inch during operation of said motor.

References Cited

UNITED STATES PATENTS

| 1,946,439 | 2/1934 | Heller | 308—207.1 |
| 2,188,675 | 1/1940 | Cramer et al. | |
| 2,387,105 | 10/1945 | Yager. | |
| 2,903,108 | 9/1959 | Ochtman | 192—18 |
| 2,905,121 | 9/1959 | Gerhaud | 192—18 |

FOREIGN PATENTS 210,439  9/1957  Australia.

MARTIN P. SCHWADRON, *Primary Examiner.*

FRANK SUSKO, *Assistant Examiner.*